United States Patent
Shinkai et al.

(10) Patent No.: US 6,918,530 B2
(45) Date of Patent: Jul. 19, 2005

(54) BONDED MEMBER COMPRISING DIFFERENT MATERIALS, AND PRODUCTION METHOD THEREOF

(75) Inventors: Masayuki Shinkai, Ama-Gun (JP);
Takahiro Ishikawa, Toyoake (JP);
Masahiro Kida, Ama-gun (JP);
Mitsuru Ohta, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 58 days.

(21) Appl. No.: 10/348,471

(22) Filed: Jan. 21, 2003

(65) Prior Publication Data

US 2003/0141345 A1 Jul. 31, 2003

(30) Foreign Application Priority Data

Jan. 25, 2002 (JP) ........................................ 2002-017756

(51) Int. Cl.⁷ ................................................ B23K 31/02
(52) U.S. Cl. ................................ 228/122.1; 228/123.1
(58) Field of Search ............................ 228/245, 248.1, 228/254, 123.1, 122.1; 428/672, 627, 621

(56) References Cited

U.S. PATENT DOCUMENTS

| | | | |
|---|---|---|---|
| 4,901,904 A * | 2/1990 | Tsuno ........................ | 228/56.3 |
| 5,023,147 A * | 6/1991 | Nakata et al. ............... | 428/627 |
| 6,291,804 B1 * | 9/2001 | Fujii .......................... | 219/541 |
| 6,391,473 B2 * | 5/2002 | Numakura et al. .......... | 428/627 |
| 2003/0157360 A1 * | 8/2003 | Shinkai et al. ............... | 428/621 |
| 2004/0126612 A1 * | 7/2004 | Shinkai et al. ............... | 428/627 |
| 2004/0146737 A1 * | 7/2004 | Fujii et al. ................... | 428/632 |

FOREIGN PATENT DOCUMENTS

| | | |
|---|---|---|
| JP | 10-209255 | 8/1998 |
| JP | 11-278951 | 10/1999 |
| JP | 2001-199775 | 7/2001 |
| JP | 2002-37679 | 2/2002 |

OTHER PUBLICATIONS

Shirzadi et al., *Analytical Modelling of Transient Liquid Phase (TLP) Diffusion Bonding When A Temperature Gradient is Imposed.* Acta Mater. vol. 47, No. 13, pp. 3551–3560, 1999. University of Cambridge.

* cited by examiner

Primary Examiner—Jonathan Johnson
(74) Attorney, Agent, or Firm—Burr & Brown (57) ABSTRACT

A bonded member including a ceramic base material 1 and a metallic member 7 which are bonded together, wherein a solder material 5 comprising Au is disposed on the surface of the ceramic base material 1 via an active metal layer, the active metal layer and the solder material 5 are molten by heating so as to form a precoat layer 6, the metallic member 7 is disposed on the surface of the precoat layer 6 via an insertion metal layer comprising pure metal which may form an alloy having a lower melting point than Au with Au or an alloy of the pure metal and Au, and the insertion metal layer and at least a portion in the vicinity of the interface between the insertion metal layer and the precoat layer 6 are molten by heating to bond the metallic member 7 and the precoat layer 6.

16 Claims, 5 Drawing Sheets

BONDED MEMBER COMPRISING DIFFERENT MATERIALS, AND PRODUCTION METHOD THEREOF

BACKGROUND OF THE INVENTION

1. Field of the Invention

The present invention relates to a bonded member comprising a ceramic base material and a metallic member which are bonded to each other, and a method for producing the bonded member.

2. Description of the Related Art

As a method of bonding different materials such as a ceramic base material and a metallic member to each other, a method such as one using a solder material can be used. However, during a cooling process after high-temperature bonding, thermal stress caused by a difference in thermal expansion coefficient between the different materials or between the solder material used for bonding the different materials together and the materials occurs, thereby causing separation at the interface between the materials or causing cracks in the vicinity of the interface if one of the materials is brittle, so that desired bonding strength and air tightness cannot be obtained in some cases. Since products having the aforementioned troubles broken during a production process must be discarded as defective products, this results in an unfavorable increase in production costs of these composite bonded members. Further, if the product is subjected to thermal cycles in use, these troubles occur after use for a certain time period to cause a deterioration in the reliability of the product.

As a method of bonding a ceramic base material (hereinafter often simply referred to as "base material") and a metallic member to each other by use of a solder material, a metallization soldering method and a direct soldering method are available. The metallization soldering method is one in which a metal layer is formed on the surface of a ceramic by deposition from a vapor phase, vapor deposition, sputtering or a method in which paste is applied to the ceramic surface and then heated and then a metallic material is bonded to the ceramic via the metal layer. Meanwhile, as the direct soldering method, an active metal method is particularly well-known in which a metallic material is bonded to ceramic by use of an element in group IV of the Periodic Table as an insert material. Meanwhile, in these methods, unless some measures are taken against thermal stress, which occurs at the interface between bonded materials, so as to reduce the thermal stress, cracks are often formed in a base material which is vulnerable to the thermal stress or separation occurs at the interface, so that bonding strength as well as various properties required from a composite bonded member such as air tightness may be influenced. Particularly, it is very difficult to bond a low-strength base material such as aluminum nitride and a member composed of metal or the like to each other without the occurrence of the above problems.

To solve the above problems, a method of bonding a base material and a metallic member together through liquid-phase bonding using a solder material comprising a metal of low proof stress such as Ag, Cu or Au which undergoes plastic deformation by a low stress can be conceived. However, in a case where a solder material comprising Ag or Cu is used, they may be difficult to use in some cases due to a problem caused by oxidation of the solder material when a composite member obtained is exposed to an application environment of 400° C. or higher under an oxidizing atmosphere, a problem of evaporation of the solder material which is caused by a high vapor pressure when the composite member is used at a high temperature and a low pressure, a problem of migration when the composite member is energized upon use, and a problem of a reaction with an Mo oxide.

Meanwhile, use of a solder material comprising Au is effective for avoiding the foregoing problems which may occur when the Ag or Cu solder material is used. However, when Ni, Co, Kovar or the like is used as a metallic member having excellent oxidation resistance, its constituents (Fe, Ni, Co) diffuse into Au which constitutes the solder material, thereby increasing the proof stress of Au. As a result, the base material is cracked by a thermal cycle and thermal shock.

It is known that when an Au-18Ni solder material and an electrical conductor comprising Mo are bonded to each other, Ni in the solder material reacts with Mo, thereby forming a fragile structure. Accordingly, durability when the bonded interface is exposed to a thermal cycle and thermal shock lowers and the bonded interface deteriorates rapidly, so that there arises a problem that equipment and apparatus having such a bonded interface are liable to be impossible to use.

Meanwhile, use of metal which does not form a solid solution with Au which constitutes the solder material as the metallic member is also conceivable, and illustrative examples of metals which meet the requirement include W and Mo. However, these metals are vigorously oxidized at high temperatures in the air. Therefore, they are not suitable for use as metal materials for members whose exposure to a high temperature atmosphere is imaginable, such as a feeding terminal for a susceptor and a metal ring for attaching the susceptor to a chamber (hereinafter simply referred to as "chamber") for producing a semiconductor.

Figure 4:
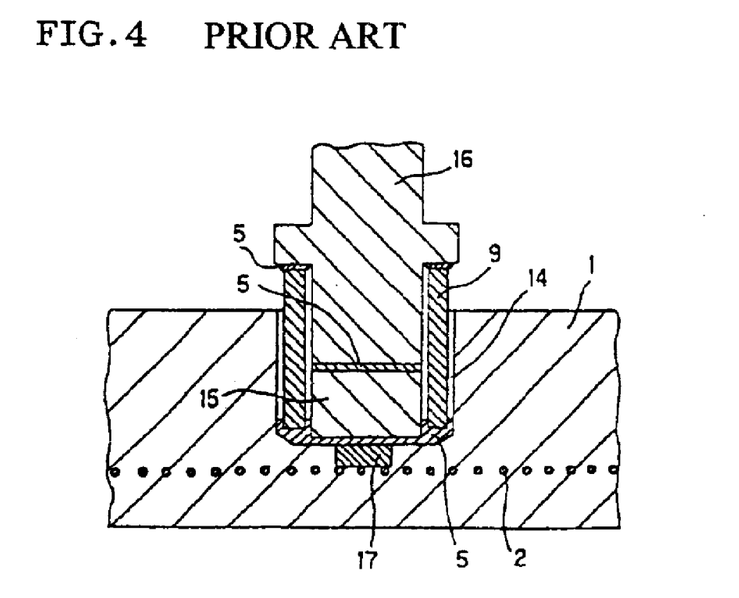
FIG. 4 is a sectional diagram showing a bonding structure of a susceptor for disposing a semiconductor wafer according to the prior art.

To solve the above problems, it has been attempted to devise the bonding structure. For example, JP-A-10-209255 discloses a bonding structure of a ceramic base material and a connector for power supply according to the structure shown in FIG. 4 as a susceptor for disposing a semiconductor wafer. In FIG. 4, a hole 14 is provided in a ceramic base material 1. A metallic member 17 such as Mo which is embedded in the ceramic base material 1 beforehand and has a thermal expansion coefficient approximate to that of the ceramic base material 1 is exposed from the hole 14. Further, a cylindrical atmosphere protector 9 is inserted in the hole 14. Inside the protector 9, a connector 16 for supplying power and a low thermal expansion material 15 intended for stress relaxation are inserted. The protector 9 and the connector 16 are hermetically bonded together by means of a solder material 5, and the material 15 and the protector 9 are hermetically bonded to the metallic member 17 by means of the solder material 5.

According to this bonding structure, residual stresses at the time of bonding are relaxed by the low thermal expansion material 15 and the metallic member 17, and oxidation of the metallic member 17 such as Mo is inhibited by the atmosphere protector 9. Hence, even if bonding is carried out by use of a solder material of high proof stress such as the foregoing Au-18Ni solder material, no cracks occur in the ceramic base material 1, and endurance reliability when the bonded interfaces are exposed to a thermal cycle and thermal shock upon use of a high temperature heater is also high. However, the foregoing bonding structure has such problems that the number of parts is large and that since deterioration of the metallic member 17 occurs due to its oxidation if the atmosphere protector 9 and the metallic member 17 are not fully bonded to each other, a very high production control ability is required.

Figure 5:
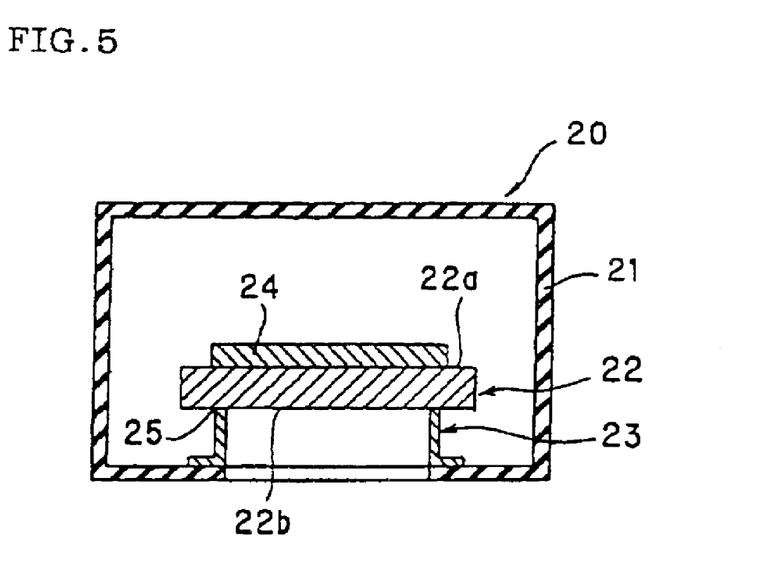
FIG. 5 is a sectional diagram showing another bonding structure of the susceptor for disposing a semiconductor wafer according to the prior art.
Figure 6:
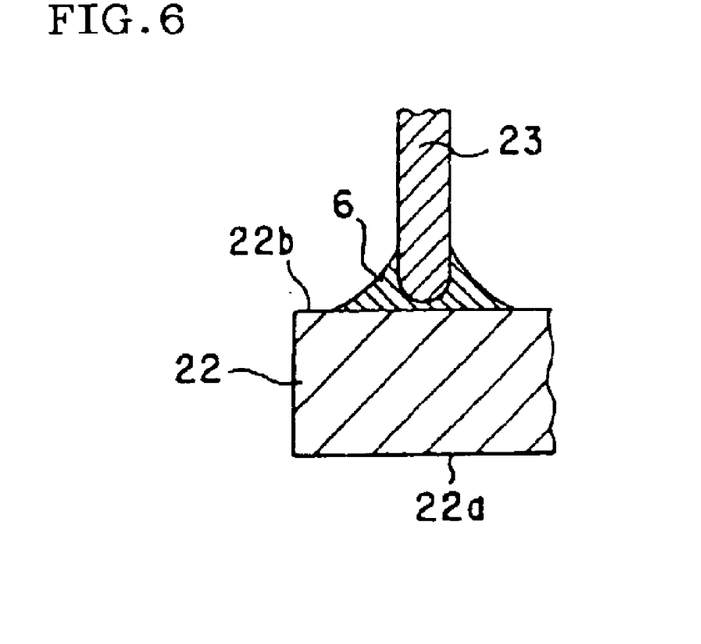
FIG. 6 is a local sectional diagram showing a bonding form of a ring and a susceptor according to the prior art.
Figure 7:
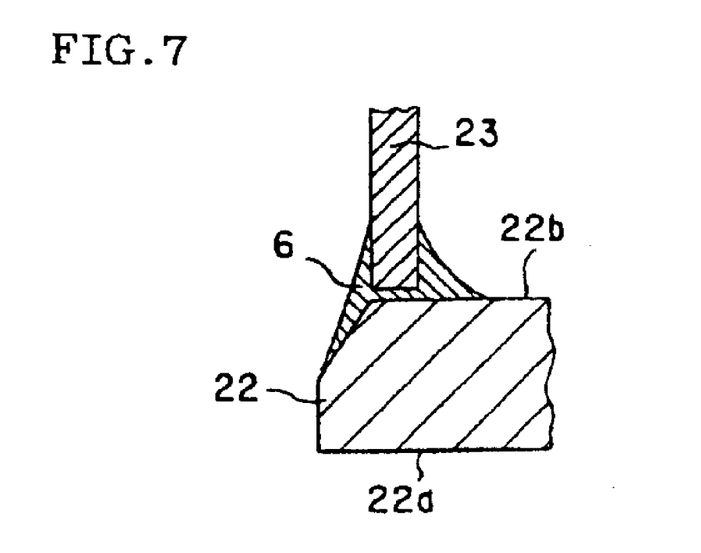
FIG. 7 is a local sectional diagram showing another bonding form of the ring and the susceptor according to the prior art.

Further, JP-A-11-278951 discloses, as a susceptor for disposing a semiconductor wafer, a composite member adopting a member structure such as the one shown in FIG. 6 or 7 so as to relax thermal stress which occurs when a corrosion-resistant metal ring 23 made of Kovar or the like is bonded to the back side 22b of a ceramic susceptor 22 in a base material associated with the structure shown in FIG. 5, and a bonding method therefor. Adoption of such a member structure is effective for relaxation of thermal stress. However, since a Cu-based solder material is used, usable temperatures are limited due to the forgoing problem caused by oxidation of the solder material and the foregoing problem of evaporation of the solder material which is caused by a high vapor pressure.

To solve the foregoing various problems, the present inventor has proposed in Japanese Patent Application Number 2000-227291 a composite member produced by solid-phase bonding a ceramic base material and a metallic member to each other by use of an Au solder material, and a production method thereof. According to the production method of the composite member, since solid-phase bonding makes it possible to bond the base material and the metallic member together with low proof stress of the Au solder material maintained, the base material is hardly broken at the time of bonding, and durability of the interface between the bonded materials hardly lowers even when the interface is exposed to a thermal cycle or thermal stress. Thus, the production method exhibits such significantly excellent effects. However, in the solid-phase bonding adopted in the production method of a composite member which is proposed in the foregoing specification, a pressing operation and other operations are required, and it is imaginable that procedures of the operations may be complicated in some cases. Hence, the method is susceptible to further improvements.

SUMMARY OF THE INVENTION

The present invention has been conceived in view of such problems of the prior art. An object of the present invention is to provide a bonded member comprising different materials which are bonded together, the bonded member having air tightness at the interface between the bonded materials and also having thermal cycle properties and thermal shock properties and being able to be produced by a simple operation, and an easy-to-practice production method of the bonded member comprising different materials.

That is, according to the present invention, there is provided a bonded member comprising a ceramic base material and a metallic member which are bonded together. A solder material comprising Au is disposed on the surface of the ceramic base material via an active metal layer, the active metal layer and the solder material are made molten by heating so as to form a precoat layer. The metallic member is disposed on the surface of the precoat layer via an insertion metal layer comprising pure metal which may form an alloy having a lower melting point than Au with Au or an alloy of the pure metal and Au, and the insertion metal layer and at least a portion in the vicinity of the interface between the insertion metal layer and the precoat layer are made molten by heating so as to bond the metallic member and the precoat layer together, thereby bonding the ceramic base material and the metallic member together.

In the present invention, the active metal layer is preferably formed by disposing an active metal foil or by sputtering, and the active metal layer together with Au placed thereon is preferably made molten by heating to form the precoat layer in which Au is bonded to the surface of the ceramic base material by a reaction layer of the active metal. Further, the precoat layer is preferably formed by applying a paste comprising an active metal and Au and melting the paste by heating. In the present invention, the insertion metal layer is preferably formed by disposing a foil or powders of the pure metal or the alloy.

In the present invention, the pure metal is preferably at least one metal selected from the group consisting of Al, In, Sn, Ge, Tl, Be, Ga, Si, Zn, Sb, Te, Th, Pb, Mg, Ce, Cd, As, and Bi. In the present invention, the amount of the pure metal constituting the insertion metal layer is preferably 0.01 to 10% by mass based on the amount of the solder material. Similarly, the amount of the alloy constituting the insertion metal layer is also preferably 0.01 to 10% by mass based on the amount of the solder material.

In the present invention, the ceramic constituting the ceramic base material is preferably aluminium nitride. In the present invention, the metal constituting the metallic member is preferably at least one metal selected from the group consisting of Ni, Co, Fe, and Cr. Similarly, the metal constituting the metallic member is preferably an alloy containing as a major component at least one metal selected from the group consisting of Ni, Co, Fe, and Cr.

In the present invention, the metal constituting the active metal layer is preferably at least one metal selected from the group consisting of Ti, Nb, Hf, and Zr. Further, in the present invention, the precoat layer is preferably formed by disposing the solder material on the surface of the ceramic base material via a metallized layer formed by use of a paste or by a vapor phase process in place of the active metal layer and then melting the solder material by heating or solid-phase bonding the solder material by pressing. In the present invention, an electrical conductor comprising Mo, W or an alloy of Mo and W is preferably embedded in the ceramic base material with a portion of the surface of the electrical conductor exposed at the surface of the ceramic base material.

The bonded member of the present invention which comprises different materials is suitably used as a bonded member formed by bonding a ceramic susceptor for disposing a semiconductor wafer to a metal ring for attaching the ceramic susceptor to a chamber for producing a semiconductor. The ceramic constituting the ceramic susceptor is preferably aluminium nitride, and the metal constituting the metal ring is preferably Kovar.

In the bonded member of the present invention which comprises different materials, the bonding layer is suitably exposed to an atmosphere outside the semiconductor producing chamber and an atmosphere inside the chamber which has a lower pressure than the outside atmosphere. It is suitably used when the solder material layer is exposed to the inside atmosphere at a temperature of 400° C. or higher.

The bonded member of the present invention which comprises different materials is suitable for use as a susceptor for disposing a semiconductor wafer. It is suitably employed when the metallic member is a terminal for feeding power to the electrical conductor, and the bonding layer is exposed to the outside atmosphere.

In the present invention, it is preferable that the ceramic base material has a concave portion, the precoat layer having a shape which fits in the concave portion along the internal surface of the concave portion is formed inside the concave portion, and the metallic member having a convex portion which may fit on the precoat layer is also disposed in the concave portion. Further, it is also preferable that the concave precoat layer has the shape of a tapered cone or a tapered truncated cone, and the convex portion has the shape of a tapered cone or tapered truncated cone which may fit on the concave precoat layer.

Further, in the present invention, it is preferable that a cross section in a vertical direction of the precoat layer has the shape of a tapered triangle or a tapered trapezoid, and a cross section in a vertical direction of the convex portion has the shape of a tapered triangle or tapered trapezoid which may fit the cross section in the vertical direction of the precoat layer.

In the present invention, the bonding layer preferably has a Vickers hardness of $Hv_{0.1}80$ or less. It is also preferable that the bonding layer has a portion having a Vickers hardness of $Hv_{0.1}80$ or less and a thickness 30 μm or more.

Further, according to the present invention, there is also provided a method for producing a bonded member by bonding a ceramic base material and a metallic member together. The method includes the steps of disposing a solder material comprising Au on the surface of the ceramic base material via an active metal layer, melting the active metal layer and the solder material by heating so as to form a precoat layer, disposing the metallic member on the surface of the precoat layer via an insertion metal layer comprising pure metal which may form an alloy having a lower melting point than Au with Au or an alloy of the pure metal and Au, and melting the insertion metal layer and at least a portion in the vicinity of the interface between the insertion metal layer and the precoat layer by heating so as to bond the metallic member and the precoat layer together, thereby bonding the ceramic base material and the metallic member together.

In the present invention, the active metal layer is preferably formed by disposing an active metal foil or by sputtering, and the active metal layer together with Au placed thereon is preferably molten by heating to form the precoat layer in which Au is bonded to the surface of the ceramic base material by a reaction layer of active metal. Further, paste comprising an active metal and Au is preferably applied and then made molten by heating. In the present invention, the insertion metal layer is preferably formed by disposing a foil or powders of the pure metal or the alloy.

In the present invention, as the pure metal, at least one metal selected from the group consisting of Al, In, Sn, Ge, Ti, Be, Ga, Si, Zn, Sb, Te, Th, Pb, Mg, Ce, Cd, As, and Bi is preferably used. In the present invention, the pure metal is preferably used in an amount of 0.01 to 10% by mass based on the amount of the solder material. Similarly, the alloy is preferably used in an amount of 0.01 to 10% by mass based on the amount of the solder material.

In the present invention, as the ceramic constituting the ceramic base material, aluminium nitride is preferably used. In the present invention, as the metal constituting the metallic member, at least one metal selected from the group consisting of Ni, Co, Fe, and Cr is preferably used. Similarly, as the metal constituting the metallic member, an alloy containing as a major component at least one metal selected from the group consisting of Ni, Co, Fe, and Cr is also preferably used.

In the present invention, as the metal constituting the active metal layer, at least one metal selected from the group consisting of Ti, Nb, Hf, and Zr is preferably used. Further, in the present invention, the precoat layer is preferably formed by forming a metallized layer on the surface of the ceramic base material by use of a paste or by a vapor phase process in place of disposing the active metal layer, disposing the solder material on the metallized layer, and melting the solder material by heating or solid-phase bonding the solder material by pressing. In the present invention, it is preferable to use a ceramic base material in which an electrical conductor comprising Mo, W or an alloy of Mo and W is embedded with a portion of the surface of the electrical conductor exposed at the surface of the ceramic base material.

In the present invention, it is preferable that the ceramic base material has a concave portion, the precoat layer has a shape which fits in the concave portion along the internal surface of the concave portion is formed inside the concave portion, and the metallic member has a convex portion which may fit on the precoat layer is also disposed in the concave portion, and it is also preferable that the concave precoat layer be formed so as to have the shape of a tapered cone or a tapered truncated cone, and the metallic member with the convex portion having the shape of a tapered cone or tapered truncated cone which may fit the concave shape be disposed. In the present invention, it is also preferable that the concave precoat layer be formed such that its cross section in a vertical direction has the shape of a tapered triangle or a tapered trapezoid, and the metallic member having the convex portion whose cross section in a vertical direction has the shape of a tapered triangle or tapered trapezoid which may fit the cross section in the vertical direction of the precoat layer be disposed.

DETAILED DESCRIPTION OF THE INVENTION

Hereinafter, embodiments of the present invention will be described. However, the present invention shall not be limited to the following embodiments. It should be understood that modifications and alterations with respect to its design will be made as required based on general knowledge of those skilled in the art without deviating from the scope of the present invention.

A first aspect of the present invention is a bonded member comprising a base material and a metallic member which are bonded together, wherein a solder material comprising Au is disposed on the surface of the base material via an active metal layer, the active metal layer and the solder material are molten by heating so as to form a precoat layer, the metallic member is disposed on the surface of the precoat layer via an insertion metal layer comprising pure metal which may form an alloy having a lower melting point than Au with Au or an alloy of the pure metal and Au, and the insertion metal layer and at least a portion in the vicinity of the interface between the insertion metal layer and the precoat layer are molten by heating to bond the metallic member and the precoat layer together so as to bond the base material and the metallic member together. Hereinafter, details of the bonded member of the present invention will be described.

Figure 1A:
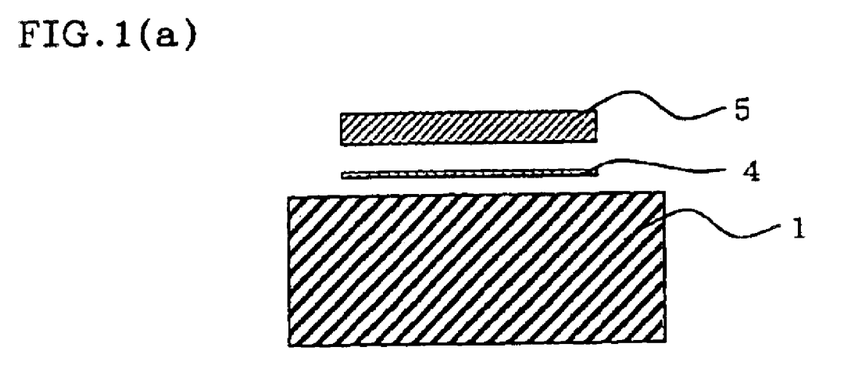
FIGS. 1(a) to (c) are a schematic diagram showing one embodiment of a production method of a bonded member comprising different materials according to the present invention.
Figure 1B:
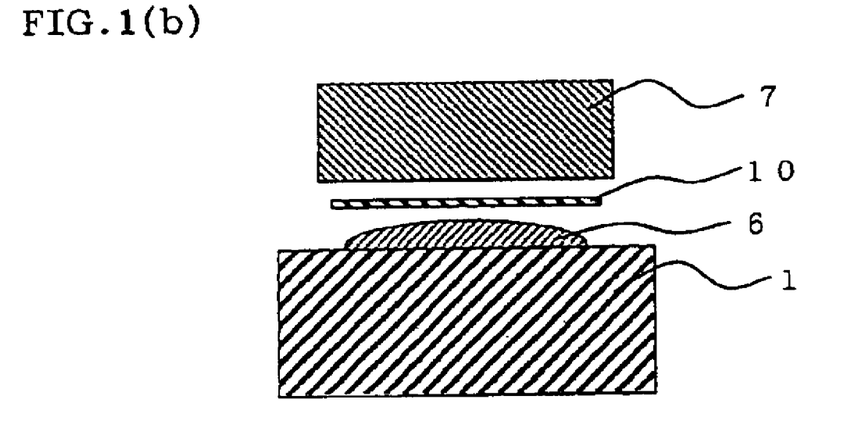
Figure 1C:
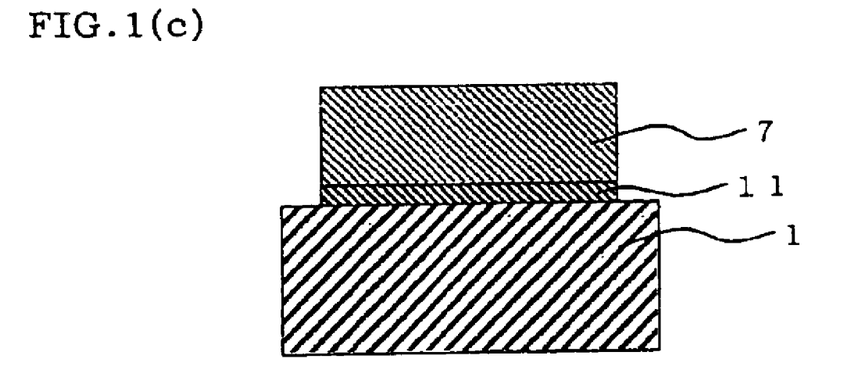

FIGS. 1(a) to (c) are a schematic diagram showing one embodiment of a production method of a bonded member comprising different materials according to the present invention. In the present invention, firstly, an active metal foil 4 and a solder material 5 comprising Au are disposed so as to cover the surface of a base material 1, and the active metal foil 4 and the solder material 5 are then heated so as to form a precoat layer 6 (FIG. 1(a)). Then, on the surface of the formed precoat layer 6, a metal foil 10 and a metallic member 7 to be bonded to the base material 1 are disposed (FIG. 1(b)) and then heated so as to produce a bonded member comprising different materials according to the present invention (FIG. 1(c)).

FIG. 1(a) shows an embodiment in which an active metal layer (not shown) is formed by disposing the active metal foil 4. However, in the present invention, in addition to disposition of the foil, the active metal layer may be formed by sputtering, in view of easy handling and a freely adjustable layer thickness.

The active metal foil 4 disposed on the surface of the base material 1 is active against the base material 1 and forms a reaction product layer (not shown) at the interface between the base material 1 and the solder material 5. Hence, wetting properties of the solder material 5 against the base material 1 are improved, and a precoat layer 6 having good air tightness is formed (FIG. 1(b)). Further, upon formation of the reaction product layer, metal elements constituting the active metal foil 4 are nearly wholly consumed at the aforementioned interface and do not remain in the precoat layer 6, so that a phenomenon in which the proof stress value of the precoat layer 6 increases does not occur.

For example, when the ceramic constituting the base material is AlN (aluminum nitride) and the metal constituting the active metal foil is Ti, a layer (thin film layer) of a reaction product which is TiN (titanium nitride) is formed at the interface between the base material and the solder material by heating. At this time, Ti is wholly consumed in a reaction with AlN, so that Ti does not form a solid solution with the solder material, and a precoat layer having low proof stress of the solder material is formed.

In the above case, the amount of Ti is preferably 0.03 to 10% by mass, more preferably 0.1 to 2% by mass, based on Au which is metal constituting the solder material. When the amount is below 0.03% by mass, poor bonding may occur, while when the amount exceeds 10% by mass, Ti remains in the solder material and increases the proof stress of Au, whereby AlN may be cracked disadvantageously. The precoat layer may be formed by applying paste comprising an active metal and Au on the base material and then melting the paste by heating. Suitable amounts of Ti based on Au contained in the paste are the same as those in the aforementioned case where the foil (Ti) is disposed and those in a case where the active metal layer is formed by sputtering.

The metal constituting the solder material used for producing the bonded member of the present invention which comprises different materials bonded together is Au. Au is a soft metal having low proof stress and may constitute a solder material capable of relaxing thermal stress caused by thermal shock through plastic deformation. Accordingly, the bonded member of the present invention which comprises different materials bonded together has high thermal shock resistance and improved thermal cycle properties. The temperature at which the active metal foil and the solder material are heated at the time of formation of the precoat layer is preferably 1,080 to 1,200° C., more preferably 1,100 to 1,150° C., in consideration of the melting point of Au which is metal constituting the solder material.

Although the amount of the solder material used varies according to the shapes of the portions to be bonded and other factors, it must be sufficient to cover the disposed active metal foil and provide a minimum thickness which exhibits a stress relaxing effect at the time of bonding. In the present invention, the metal constituting the insertion metal layer and the metal (impurity metal) constituting the metallic member to be bonded diffuse into the precoat layer, whereby a certain thickness in a portion where liquid-phase diffusion occurs in the precoat layer is cured. Therefore, to leave at least 20 $\mu$m of the thickness of a bonding layer unaffected by curing caused by diffusion of the impurity metal after bonding, the thickness of the solder material is preferably at least 50 $\mu$m, more preferably at least 100 $\mu$m. The foregoing unaffected thickness of at least 20 $\mu$m is required by the bonding layer to exhibit an effective stress relaxing effect. That is, the amount of the solder material used may be any amount which can provide such a thickness, and it is needless to say that the amount of the solder material can be adjusted freely as long as it can be made molten by heating. Further, in addition to Au, the solder material may also comprise metals other than Au as long as these metals do not prevent Au from relaxing thermal stress through thermal deformation.

The insertion metal layer disposed on the surface of the precoat layer comprises a metal having a lower melting point than Au, a metal which causes an eutectic reaction with Au, or an alloy (low-melting-point gold alloy) of the pure metal and Au. More specifically, as the pure metal, at least one metal selected from the group consisting of Al, In, Sn, Ge, Tl, Be, Ga, Si, Zn, Sb, Te, Th, Pb, Mg, Ce, Cd, As, and Bi is suitably used.

Specific examples of the foregoing low-melting-point gold alloy include Au-5Al and Au-3Al. FIG. 1(b) shows an embodiment in which the metal foil 10 is disposed on the precoat layer 6. In the present invention, however, in addition to disposition of a metal foil such as the metal foil 10, powders of a comparable pure metal or low-melting-point gold alloy may be disposed on the precoat layer. Particularly, since some low-melting-point gold alloys are often brittle and difficult to handle as a foil in some cases, they become easier to handle in powdery form. However, the insertion metal layer must be formed densely by the above powders so that the precoat layer and the metallic member substantially do not make contact with each other.

The temperature at which the insertion metal layer and a portion of the precoat layer which is in the vicinity of the interface between the insertion metal layer and the precoat layer disposed in contact with the insertion metal layer are heated varies according to the ratio (mass ratio) between the amount of the insertion metal layer and the amount of Au constituting the solder material and the type of pure metal or alloy constituting the insertion metal layer. However, since the precoat layer and the insertion metal. layer can form an alloy having a lower melting point than Au, more specifically, an alloy of eutectic composition, or since the insertion metal layer itself is an alloy of eutectic composition, the temperature at which the insertion metal layer is heated may be lower than the melting point of Au. For example, when the metal constituting the insertion metal layer is Al, the portion in the vicinity of the interface between the insertion metal layer (Al) and the precoat layer can be made molten at a heating temperature of 600° C. or lower by adjusting the ratio (mass ratio) between the amount of Al and the amount of the solder material used.

Further, since mutual diffusion of metal components occurs between the insertion metal layer and the precoat layer after the heating, they are kept at the same temperature even after the heating so as to solidify and form the bonding layer, thereby bonding the base material and the metallic member together. Further, since the bonding is so-called liquid-phase diffusion bonding which proceeds by melting at least a portion of the precoat layer by heating, no special operation of pressing the metallic member to be bonded against the precoat layer is required, and the base material and the metallic member can be bonded together only by keeping the insertion metal layer and the precoat layer at the same temperature, so that an operating procedure is very simple.

In the bonded member comprising different materials according to the present invention, diffusion of metal elements constituting the metallic member occurs only in the foregoing constant-temperature solidified portion of the precoat layer in the vicinity of the interface. Thus, further diffusion of the metal elements into the precoat layer is inhibited effectively, so that the bonding layer is formed without impairing low proof stress which is a characteristic of the solder material comprising Au. Consequently, the bonded member of the present invention which comprises different materials bonded together exhibits such an effect that durability of the interface between the bonded different materials hardly lowers even when it is exposed to a thermal cycle or thermal shock.

In the present invention, the amount of pure metal constituting the insertion metal layer is preferably 0.01 to 10% by mass, more preferably 0.05 to 8% by mass, particularly preferably 0.1 to 5% by mass, based on the amount of the solder material. When the amount is below 0.01% by mass, an absolute amount of pure metal to be molten is insufficient with respect to Au, so that so-called liquid-phase diffusion bonding does not occur easily disadvantageously, while when the amount exceeds 10% by mass, the amount of pure metal remaining in the bonding layer to be formed is large, so that its proof stress value increases remarkably disadvantageously.

Similarly, the amount of a pure-metal/Au alloy constituting the insertion metal layer is preferably 0.01 to 10% by mass, more preferably 0.05 to 8% by mass, particularly preferably 0.1 to 5% by mass, based on the amount of the solder material. As in the foregoing case, when the amount is below 0.01% by mass, an absolute amount of an alloy to be molten is insufficient, so that so-called liquid-phase diffusion bonding does not occur easily disadvantageously, while when the amount exceeds 10% by mass, the amount of an alloy remaining in the bonding layer to be formed is large, so that its proof stress value increases remarkably disadvantageously.

In the present invention, the ceramic constituting the base material is preferably a brittle material which hardly provides reliability to a bonded member comprising the material and a metallic member which are bonded together by a general bonding process and which has strict requirements for a usable temperature range, i.e., aluminum nitride. The base material does not have to be constituted by aluminium nitride alone and may be constituted by a combination of various types of materials. Therefore, by selecting types of materials constituting the base material or a combination of the materials as required, there can be provided a bonded member comprising different materials which is suitable for applications requiring heat resistance or hardness, equipment, apparatus, and the like into which the present bonded member is integrated.

Further, in the present invention, the metal constituting the metallic member is preferably at least one metal selected from the group consisting of Ni, Co, Fe and Cr or an alloy containing as a major component at least one metal selected from the group consisting of Ni, Co, Fe and Cr. These metals and alloys are hardly oxidized in an oxidation resistance test conducted at 800° C. in the air, have oxidation resistance required for them to be used as a feeding metal terminal for a susceptor for disposing a semiconductor wafer which is used in production of semiconductors, and also have excellent conductivity required for them to be used as the metal terminal. Thus, they are preferable materials in that they can constitute the member for the susceptor and that they are inexpensive and easy to obtain.

Further, in the present invention, the "alloy containing as a major component at least one metal selected from the group consisting of Ni, Co, Fe and Cr" refers to an alloy having such a total content of these metals that makes physical properties of any of the metal elements Ni, Co, Fe and Cr conspicuous, more specifically, to an alloy having a total content of Ni, Co, Fe and Cr of 50% or more by mass. In addition, the shape of the metallic member is not limited to the shape shown in FIGS. 1(a) to (c), and a variety of shapes including a cylinder, a prism, a steeple, a ring and the like can be used.

In the present invention, the metal constituting the active metal foil is preferably at least one metal selected from the group consisting of Ti, Nb, Hf and Zr. These active metal foils form a solid solution with the Au solder material once and then form a layer of a reaction product such as a nitride. Thereby, wetting properties of the solder material against the base material are improved. Further, when a given amount of these metals is used in the form of a foil, they are nearly wholly consumed in the reaction occurring at the interface and therefore do not remain in the precoat layer. Consequently, the proof stress of the bonding layer of the bonded member of the present invention which comprises different materials bonded together is kept low, and the bonding layer can reduce thermal stress by the relaxing effect based on plastic deformation.

In the present invention, the precoat layer may also be formed by disposing the solder material on the surface of the base material via a metallized layer formed by use of paste or by a vapor phase process in place of the foregoing active metal layer, and then melting the solder material by heating or solid-phase bonding the solder material by pressing. The metallized layer is a bonding layer which can be an intermediate layer between ceramic and metal when a high-melting-point metal such as Mo, Mo—Mn, W, W—Mn or mixtures of these metals with additives such as $SiO_2$ and $TiO_2$ is heated in wetting hydrogen or a wetting foaming gas (hydrogen/nitrogen) so as to form an oxide and the like and causes an interface reaction with ceramic. A desired precoat layer can be formed not only by melting the solder material by heating but also by solid-phase bonding the solder material by pressing. Thus, since the precoat layer can be formed not only through thermal fusion but also through solid-phase bonding, even metals which are liable to form a solid solution with the Au solder material and increase the proof stress value of the precoat layer to be formed can be suitably employed.

Figure 2A:
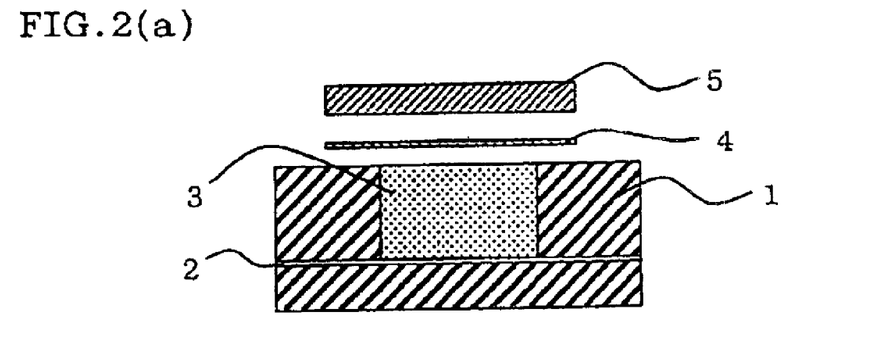
FIGS. 2(a) to (c) are a schematic diagram showing another embodiment of the production method of a bonded member comprising different materials according to the present invention.
Figures 2B, 2C:
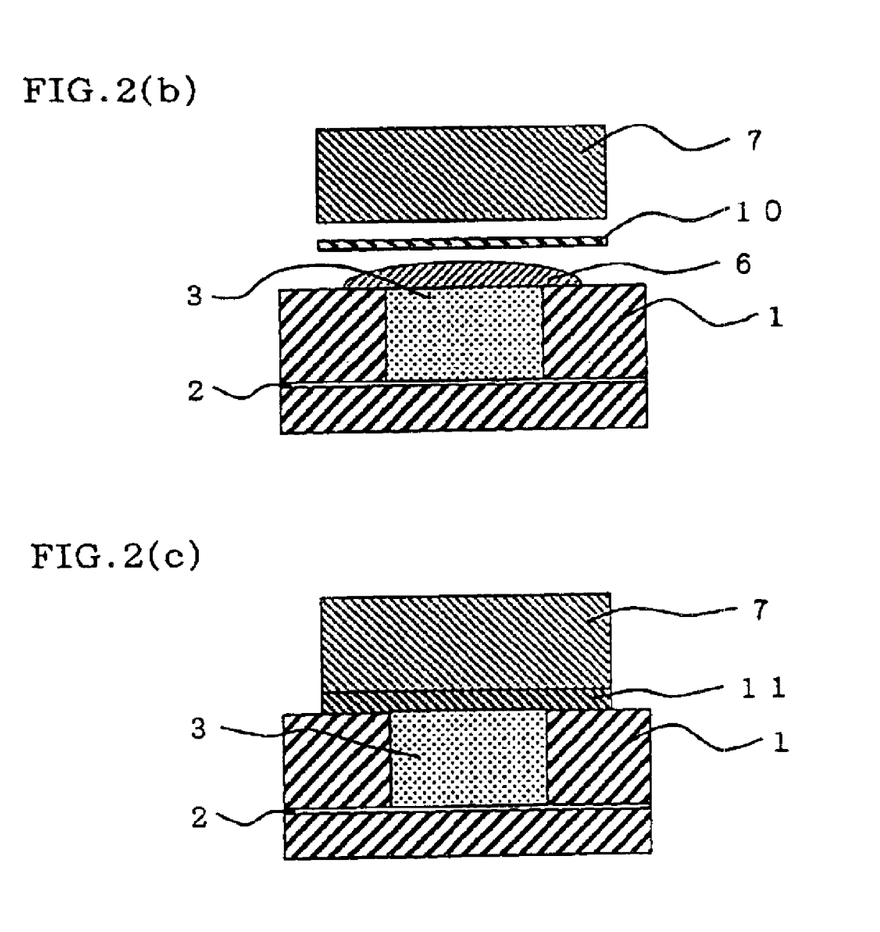

Further, in the present invention, an electrical conductor comprising Mo, W, or an alloy of Mo and W may be embedded in the base material with a portion of the surface of the electrical conductor exposed at the surface of the base material. FIG. 2 is a schematic diagram showing another embodiment of the production method of a bonded member comprising different materials according to the present invention. In a base material 1, an Mo mesh 2 and an electrical conductor (Mo) 3 are embedded. The electrical conductor (Mo) 3 is disposed in conduction with the Mo mesh 2. Firstly, an active metal foil 4 and a solder material 5 are disposed so as to cover the surface of the base material 1 and the surface of the electrical conductor (Mo) 3, and the active metal foil 4 and the solder material 5 are then heated so as to form a precoat layer 6 (FIG. 2(*a*)). Thereafter, on the surface of the formed precoat layer 6, a metal foil 10 and a metallic member 7 to be bonded to the base material 1 are disposed in the order presented (FIG. 2(*b*)), and they are heated so as to produce a bonded member according to the present invention which comprises different materials bonded together (FIG. 2(*c*)).

In FIGS. 2(*a*) to (*c*), the active metal foil 4 is active against the base material 1, and a reaction product layer (not shown) is formed at the interface between the base material 1 and the solder material 5 and at the interface between the electrical conductor (Mo) 3 and the solder material 5. Accordingly, wetting properties of the solder material 5 against the base material 1 are improved, and a bonding layer 11 with reliable air tightness is formed. Further, since the electrical conductor (Mo) 3 is not exposed to outside air and therefore hardly undergoes deterioration by oxidation, it can endure long-term use in an environment in which it is exposed to a thermal cycle and thermal shock.

The composition comprising different materials according to the present invention is suitably used as a bonded member formed by bonding a ceramic susceptor for disposing a semiconductor wafer to a metal ring for attaching the ceramic susceptor to a chamber. That is, Au has a lower vapor pressure than Ag and Cu, so that the bonded member according to the present invention which comprises different materials bonded together by use of the Au solder material can endure higher temperatures upon use than a bonded member comprising different materials by use of an Ag or Cu solder material.

Further, even in a case where the ceramic constituting the susceptor is aluminium nitride and metal constituting the metal ring is Kovar, since metals (Fe, Ni and Co) which constitute the Kovar are not liable to diffuse into the solder material, the bonded member of the present invention exhibits such effects that the proof stress value of the bonding layer does not increase and the base material is hardly cracked by a thermal cycle and thermal stress. In addition, in view of such effects, the bonded member comprising different materials according to the present invention is suitably used even when its bonding layer is exposed to an atmosphere outside the foregoing chamber and an atmosphere inside the chamber which has a lower pressure than the outside atmosphere. Particularly, the bonded member of the present invention is suitably used even in an application environment in which the solder material layer is exposed to the inside atmosphere at a temperature of 400° C. or higher.

Furthermore, by taking advantage of its excellent thermal cycle properties and thermal shock resistance, the bonded member of the present invention which comprises different materials is suitably used as a susceptor for disposing a semiconductor wafer in semiconductor producing system, more specifically, as a bonded member to be incorporated into equipment which exhibits an electrostatic chuck function or a heater function by means of an incorporated metal electrode or metal heating element, particularly, as a bonded member in which the metallic member is a feeding terminal for the electrical conductor comprising Mo, W or an alloy of Mo and W and the bonding layer is exposed to the outside atmosphere.

FIGS. 3(*a*) to (*f*) are a schematic diagram showing still another embodiment of the production method of a bonded member comprising different materials according to the present invention. FIGS. 3(*a*) to (*f*) show the following steps. That is, after a solder material 5 is disposed inside a concave portion 30 provided in a base material 1 via an active metal foil 4 (FIG. 3(*b*)), a precoat layer 6 is formed by heating (FIG. 3(*c*)). Then, after a portion of the precoat layer 6 is hollowed out (FIG. 3(*d*)), a metallic member 7 having a convex portion is placed in the hollowed portion via a metal foil 10 (FIG. 3(*e*)). Then, the base material 1 and the metallic member 7 are bonded to each other by heating (FIG. 3(*f*)). As described above, in the present invention, it is preferable that the base material 1 has the concave portion 30 (FIG. 3(*a*)), the concave precoat layer 6 having a shape that fits inside the concave portion 30, particularly the shape of a tapered cone or a tapered truncated cone, is formed in the concave portion 30, and the metallic member 7 having the convex portion which can fit on the precoat layer 6 is disposed. Further, it is also preferable that the convex portion of the metallic member 7 has the shape of a tapered cone or a tapered truncated cone so as to fit on the concave precoat layer 6. Hereinafter, details thereof will be described.

The obtained bonded member comprising different materials has the convex portion of the metallic member 7 in the concave portion 30 of the base material 1. That is, the metallic member 7 is bonded to the base material 1 not only at the foremost flat portion as shown in FIGS. 1 and 2 but also on its side, so that the obtained bonded member has excellent mechanical strength, particularly, excellent strength against a flexural load, at the interface between the bonded materials. It is possible to obtain a bonded member comprising different materials with the structure shown in FIG. 3(*f*) by solid-phase bonding set forth in the foregoing JP-A-2002-37679 by the present applicant. However, the solid-phase bonding requires a sufficient bonding load so as to further improve bonding at the interface between the bonded different materials, and the operation may be difficult to perform in some cases. In contrast, the foregoing bonded member comprising different materials according to the present invention does not require a special load and can be obtained by a simple operation.

Further, it is also preferable that a cross section in a vertical direction of the precoat layer has the shape of a tapered triangle or a tapered trapezoid, and a cross section in a vertical direction of the convex portion has the shape of a tapered triangle or tapered trapezoid which may fit the cross section in the vertical direction of the precoat layer. That is, when the precoat layer and the convex portion of the metallic member have such cross sections, the bonded member of the present invention has excellent mechanical strength, particularly, excellent strength against a flexural load, at the bonded interface even when the portion to be bonded of the metallic member has the shape of, for example, a ring, and the bonded member of the present invention can be prepared by a simple operation.

In the present invention, the bonding layer preferably has a Vickers hardness of $Hv_{0.1}80$ or less, more preferably $Hv_{0.1}70$ or less, particularly preferably $Hv_{0.1}55$ or less. If a Vickers hardness of the bonded member exceeds $HV_{0.1}80$, it is not preferable that the occurrence of cracks at the time of bonding becomes remarkable in the case that a ceramic constituting the base material is, for example, aluminium nitride having a flexural strength of about 300 to 400 MPa. In the present invention, the lower limit of the Vickers hardness is not particularly limited. However, it is needless to say that the lower the lower limit is the more desirable it is, in order to efficiently avoid problems when a thermal cycle is given. When it is assumed that a bonding layer comprising pure Au which is almost free from impurities is formed, its Vickers hardness is preferably $Hv_{0.1}45$ to $Hv_{0.1}55$.

Further, in the present invention, the bonding layer preferably includes a portion having a Vickers hardness of $Hv_{0.1}80$ or less and a thickness of 30 μm or more, more preferably a portion having a Vickers hardness of $Hv_{0.1}70$ or less and a thickness of 70 μm or more, particularly preferably a portion having a Vickers hardness of $Hv_{0.1}55$ or less and a thickness of 100 μm or more. When the portion in question has a Vickers hardness exceeding $Hv_{0.1}80$ and a thickness of below 30 μm, the bonding layer fails to exhibit a sufficient stress relaxing effect, so that the base material is broken disadvantageously. In the present invention, the lower limit of the above Vickers hardness is not particularly limited. However, it is needless to say that the lower the lower limit is the more desirable it is, in order to efficiently avoid problems when a thermal cycle is given. When it is assumed that a bonding layer comprising pure Au which is almost free from impurities is formed, its Vickers hardness is preferably $Hv_{0.1}45$ to $Hv_{0.1}55$.

Next, a second aspect of the present invention will be described. The second aspect of the present invention is a method for producing a bonded member by bonding a base material and a metallic member to each other. The method comprises the steps of disposing a solder material comprising Au on the surface of the base material via an active metal layer, melting the active metal layer and the solder material by heating to form a precoat layer, disposing the metallic member on the surface of the precoat layer via an insertion metal layer comprising pure metal which may form an alloy having a lower melting point than Au with Au or an alloy of the pure metal and Au, and melting the insertion metal layer and at least a portion in the vicinity of the interface between the insertion metal layer and the precoat layer by heating to bond the metallic member and the precoat layer together so as to bond the base material and the metallic member together. Hereinafter, details thereof will be described.

FIGS. 1(a) to (c) are a schematic diagram showing one embodiment of the production method of a bonded member comprising different materials according to the present invention. As already described above, in the present invention, firstly, an active metal foil 4 and a solder material 5 comprising Au are disposed so as to cover the surface of a base material 1, and the active metal foil 4 and the solder material 5 are then heated to form a precoat layer 6 (FIG. 1(a)). Then, on the surface of the formed precoat layer 6, a metal foil 10 and a metallic member 7 to be bonded to the base material 1 are disposed (FIG. 1(b)) and then heated so as to produce a bonded member comprising different materials according to the present invention (FIG. 1(c)).

FIG. 1(a) shows an embodiment in which an active metal layer (not shown) is formed by disposing the active metal foil 4. However, in the present invention, in addition to disposition of the foil, the active metal layer may be formed by sputtering, in view of easy handling and a freely adjustable layer thickness.

The active metal foil 4 disposed on the surface of the base material 1 is active against the base material 1 and forms a reaction product layer (not shown) at the interface between the base material 1 and the solder material 5. Hence, wetting properties of the solder material 5 against the base material 1 are improved, and a precoat layer 6 having good air tightness can be formed (FIG. 1(b)). Further, upon formation of the reaction product layer, metal elements constituting the active metal foil 4 are nearly wholly consumed at the interface and do not remain in the precoat layer 6, so that a phenomenon in which the proof stress value of the precoat layer 6 increases does not occur.

For example, when AlN (aluminum nitride) is used as the ceramic constituting the base material and Ti is used as the metal constituting the active metal foil, a layer (thin film layer) of a reaction product which is TiN (titanium nitride) is formed at the interface between the base material and the solder material by heating. At this time, Ti is wholly consumed in a reaction with AlN, so that Ti does not form a solid solution with the solder material, and a precoat layer having low proof stress of the solder material can be formed.

In the above case, Ti is preferably used in an amount of 0.03 to 10% by mass, more preferably 0.1 to 2% by mass, based on Au which is metal constituting the solder material. When the amount is below 0.03% by mass, poor bonding may occur, while when the amount exceeds 10% by mass, Ti remains in the solder material and increases the proof stress of Au, whereby AlN may be cracked disadvantageously. The precoat layer may be formed by applying paste comprising an active metal and Au on the base material in such an amount that can retain the low proof stress value of the precoat layer to be formed and then melting the paste by heating.

The metal constituting the solder material used for producing the bonded member comprising different materials according to the present invention is Au. Au is a soft metal having low proof stress and may constitute a solder material capable of relaxing thermal stress caused by thermal shock through plastic deformation. Thus, according to the present invention, there can be provided a bonded member comprising different materials which has high thermal shock resistance and improved thermal cycle properties. Further, in consideration of the melting point of Au which is metal constituting the solder material, the active metal foil and the solder material are preferably heated at 1,080 to 1,200° C., more preferably 1,100 to 1,050° C., at the time of formation of the precoat layer.

Although the amount of the solder material used varies according to the shapes of the portions to be bonded and other factors, it must be sufficient to cover the disposed active metal foil and provide a minimum thickness which exhibits a stress relaxing effect at the time of bonding. In the present invention, metal constituting the insertion metal layer and metal (impurity metal) constituting the metallic member to be bonded diffuse into the precoat layer, whereby a certain thickness in a portion where liquid-phase diffusion occurs in the precoat layer is cured. Therefore, to leave at least 20 μm of the thickness of a bonding layer unaffected by curing caused by diffusion of the impurity metal after bonding, the thickness of the solder material is preferably at least 50 μm, more preferably at least 100 μm. The foregoing unaffected thickness of at least 20 μm is required by the bonding layer to exhibit an effective stress relaxing effect. That is, the amount of the solder material used may be any amount which can provide such a thickness, and its shape can be adjusted freely as long as it can be molten by heating. Further, in addition to Au, the solder material may also comprise metals other than Au as long as these metals do not prevent Au from relaxing thermal stress through thermal deformation.

The insertion metal layer disposed on the surface of the precoat layer comprises pure metal which may form an alloy (low-melting-point gold alloy) having a lower melting point than Au with Au or an alloy (low-melting-point gold alloy) of the pure metal and Au. More specifically, as the pure metal, at least one metal selected from the group consisting of Al, In, Sn, Ge, Tl, Be, Ga, Si, Zn, Sb, Te, Th, Pb, Mg, Ce, Cd, As, and Bi is suitably used.

As the foregoing low-melting-point gold alloy, Au-5Al, Au-3Al or the like can be suitably used. FIG. 1(b) shows an embodiment in which the metal foil 10 is disposed on the precoat layer 6. In the present invention, however, in addition to disposition of a metal foil such as the metal foil 10, powders of a comparable pure metal or low-melting-point gold alloy may be disposed on the precoat layer. Particularly, since some of low-melting-point gold alloys which may be used are often brittle and difficult to handle as a foil in some cases, they become easier to handle in powdery form advantageously. However, the insertion metal layer must be formed densely by the above powders so that the precoat layer and the metallic member substantially do not make contact with each other.

The temperature at which the insertion metal layer and a portion of the precoat layer which is in the vicinity of the interface between the insertion metal layer and the precoat layer disposed in contact with the insertion metal layer are heated may be varied according to the ratio (mass ratio) between the amount of the insertion metal layer and the amount of Au constituting the solder material and the type of metal constituting the insertion metal layer. However, since the precoat layer and the insertion metal layer can form an alloy having a lower melting point than Au, more specifically, an alloy of eutectic composition, or since the insertion metal layer itself is an alloy of eutectic composition, the temperature at which the insertion metal layer is heated may be below the melting point of Au. For example, when Al is used as metal constituting the insertion metal layer, the portion in the vicinity of the interface between the insertion metal layer and the precoat layer can be molten at a heating temperature of 600° C. or lower by adjusting the ratio (mass ratio) between the amount of Al and the amount of the solder material 5 used.

Further, since mutual diffusion of metal components occurs between the insertion metal layer and the precoat layer after the heating, they are kept at the same temperature even after the heating so as to solidify and form the bonding layer, thereby making it possible to bond the base material and the metallic member to each other. Further, since the bonding is so-called liquid-phase diffusion bonding which proceeds by melting at least a portion of the precoat layer by heating, there is no need to perform a special operation of pressing the metallic member to be bonded against the precoat layer, and the base material and the metallic member can be bonded together only by keeping the insertion metal layer and the precoat layer at the same temperature, so that an operating procedure is very simple advantageously.

Since the production method of a bonded member comprising different materials according to the present invention can inhibit diffusion of metal elements constituting the metallic member into the precoat layer effectively, it can form the bonding layer without impairing low proof stress which is a characteristic of the solder material comprising Au. Consequently, in the case of a bonded member comprising different materials which is produced by the production method of the present invention, durability of the interface between the bonded different materials hardly lowers even when it is exposed to a thermal cycle or thermal shock.

In the present invention, pure metal is preferably used in an amount of 0.01 to 10% by mass, more preferably 0.05 to 8% by mass, particularly preferably 0.1 to 5% by mass, based on the amount of the solder material. When the pure metal is used in an amount of below 0.01% by mass, an absolute amount of pure metal to be molten is insufficient with respect to Au, so that so-called liquid-phase diffusion bonding does not occur easily disadvantageously, while when it is used in an amount exceeding 10% by mass, the amount of pure metal remaining in the bonding layer to be formed is large, so that its proof stress value increases remarkably disadvantageously.

Similarly, an alloy of pure metal and Au is preferably used in an amount of 0.01 to 10% by mass, more preferably 0.05 to 8% by mass, particularly preferably 0.1 to 5% by mass, based on the amount of the solder material. When the alloy is used in an amount of below 0.01% by mass, an absolute amount of an alloy to be molten is insufficient, so that so-called liquid-phase diffusion bonding does not occur easily disadvantageously, while when it is used in an amount exceeding 10% by mass, the amount of an alloy remaining in the bonding layer to be formed is large, so that its proof stress value increases remarkably disadvantageously.

Further, in the present invention, the ceramic constituting the base material should be one which is reactive with the active metal foil. More specifically, aluminum nitride is preferably used. The base material does not have to be constituted by aluminium nitride alone and may be constituted by a combination of various types of materials Therefore, by selecting types of materials constituting the base material or a combination of the materials as required, there can be provided a bonded member comprising different materials which is suitable for applications requiring heat resistance or hardness, equipment, apparatus, and the like into which the present bonded member is integrated.

In the present invention, as the metal constituting the metallic member, at least one metal selected from the group consisting of Ni, Co, Fe and Cr or an alloy containing as a major component at least one metal selected from the group consisting of Ni, Co, Fe and Cr is preferably used. When a metallic member constituting these metals and alloys is to be bonded to the precoat layer, these metal elements are not liable to form a solid solution with the precoat layer. Thus, a bonded member comprising different materials which is excellent in thermal cycle properties and thermal shock properties can be produced without impairing the low proof stress of the solder material comprising Au.

Further, these metals and alloys are hardly oxidized in an oxidation resistance test conducted at 800° C. in the air, have oxidation resistance required for them to be used as a feeding metal terminal for a susceptor for disposing a semiconductor wafer which is used in production of semiconductors, and also have excellent conductivity required for them to be used as the metal terminal. Thus, they are preferable materials in that they can constitute the member for the susceptor and that they are inexpensive and easy to obtain.

In the present invention, as the metal constituting the active metal foil, at least one metal selected from the group consisting of Ti, Nb, Hf and Zr is preferably used. These active metal foils form a solid solution with the Au solder material once and then form a layer of a reaction product such as a nitride. Thereby, wetting properties of the solder material against the base material can be improved. Further, when a given amount of these metals is used in the form of a foil, they can be nearly wholly consumed in the reaction occurring at the interface and prevented from remaining in the precoat layer. Consequently, a bonded member comprising different materials which has a bonding layer having low proof stress and exhibits a thermal stress reducing effect by a relaxing effect based on plastic deformation of the bonding layer can be produced.

In the present invention, the precoat layer may also be formed by disposing the solder material on the surface of the base material via a metallized layer formed by use of a paste or by a vapor phase process in place of the foregoing active metal layer, and then melting the solder material by heating or solid-phase bonding the solder material by pressing. Therefore, a desired precoat layer can be formed not only by melting the solder material by heating but also by solid-phase bonding the solder material by pressing. Thus, since the precoat layer can be formed not only through thermal fusion but also through solid-phase bonding, even metals which are liable to form a solid solution with the Au solder material and increase the proof stress value of the precoat layer can be employed. As the metal constituting the metallized layer, a high-melting-point metal such as Mo, Mo—Mn, W, W—Mn or mixtures of these metals with additives such as $SiO_2$ and $TiO_2$ can be suitably used.

Further, in the present invention, there may be used a base material which has an electrical conductor comprising Mo, W, or an alloy of Mo and W embedded in the base material with a portion of the surface of the electrical conductor exposed at the surface of the base material. FIG. 2 is a schematic diagram showing another embodiment of the production method of a bonded member comprising different materials according to the present invention. In a base material 1, an Mo mesh 2 and an electrical conductor (Mo) 3 are embedded. The electrical conductor (Mo) 3 is disposed in conduction with the Mo mesh 2. Firstly, an active metal foil 4 and a solder material 5 are disposed so as to cover the surface of the base material 1 and the surface of the electrical conductor (Mo) 3, and the active metal foil 4 and the solder material 5 are then heated so as to form a precoat layer 6 (FIG. 2(a)). Thereafter, on the surface of the formed precoat layer 6, a metal foil 10 and a metallic member 7 to be bonded to the base material 1 are disposed in the order presented (FIG. 2(b)) and then heated. Thereby, a bonded member comprising different materials according to the present invention can be produced (FIG. 2(c)).

In FIGS. 2(a) to (c), the active metal foil 4 is active against the base material 1, and a reaction product layer (not shown) can be formed at the interface between the base material 1 and the solder material 5 and at the interface between the electrical conductor (Mo) 3 and the solder material 5. Accordingly, wetting properties of the solder material 5 against the base material 1 can be improved, and a bonding layer 11 with reliable air tightness can be formed. Further, the electrical conductor (Mo) 3 is not exposed to outside air and therefore hardly undergoes deterioration by oxidation. Thus, a bonded member comprising different materials which can endure long-term use in an environment in which it is exposed to a thermal cycle and thermal shock can be provided.

FIGS. 3(a) to (f) are a schematic diagram showing still another embodiment of the production method of a bonded member comprising different materials according to the present invention. FIGS. 3(a) to (f) show the following steps. That is, after a solder material 5 is disposed inside a concave portion 30 provided in a base material 1 via an active metal foil 4 (FIG. 3(b)), a precoat layer 6 is formed by heating (FIG. 3(c)). Then, after a portion of the precoat layer 6 is hollowed out (FIG. 3(d)), a metallic member 7 having a convex portion is placed in the hollowed portion via a metal foil 10 (FIG. 3(e)). Then, the base material 1 and the metallic member 7 are bonded to each other by heating (FIG. 3(f)). As described above, in the present invention, it is preferable that the base material 1 has the concave portion 30 (FIG. 3(a)), the concave precoat layer 6 having a shape that fits inside the concave portion 30, particularly the shape of a tapered cone or a tapered truncated cone, is formed in the concave portion 30, and the metallic member 7 having the convex portion which can fit on the precoat layer 6 is disposed. Further, it is also preferable to use the metallic member 7 having the convex portion having the shape of a tapered cone or a tapered truncated cone so as to fit on the concave precoat layer 6. Hereinafter, details thereof will be described.

Since the convex portion of the metallic member 7 is disposed in the concave portion 30 of the base material 1, the metallic member 7 can be bonded to the base material 1 not only at the foremost flat portion as shown in FIGS. 1 and 2 but also on its side, so that a bonded member comprising different materials which has excellent mechanical strength, particularly, excellent strength against a flexural load, at the interface between the bonded materials can be produced. It is possible to obtain a bonded member comprising different materials with the structure shown in FIG. 3(f) by solid-phase bonding set forth in the foregoing JP-A-2002-227291 by the present applicant. However, it is required to impose a sufficient bonding load so as to further improve bonding at the interface between the bonded different materials. This makes the operation difficult to perform in some cases. In contrast, the foregoing method of the present invention has such advantages that it requires no special load and the operation can be very simple and easy.

Further, it is also preferable that the precoat layer be formed so that a cross section in a vertical direction of the concave precoat layer has the shape of a tapered triangle or a tapered trapezoid, and a metallic member having a convex portion whose cross section in a vertical direction has the shape of a tapered triangle or tapered trapezoid which may fit the shape of the cross section in the vertical direction of the precoat layer is disposed. That is, when the precoat layer and the convex portion of the metallic member have such cross sections, a bonded member comprising different materials which has excellent mechanical strength, particularly, excellent strength against a flexural load, at the bonded interface can be produced by a simple operation, even when the portion to be bonded of the metallic member has the shape of, for example, a ring.

EXAMPLES

Hereinafter, examples of the present invention will be described. However, it is needless to say that the present invention shall not be limited to the following examples.

Examples 1 to 8

On the surface of a base material made of AlN, a Ti foil having a diameter of 6.5 mm and a thickness of 5 μm (weight: about 0.75 mg) was disposed, and on the Ti foil, a pure Au solder material having a diameter of 6.5 mm and a thickness of 600 µm (weight: about 385 mg) was disposed. Then, they were heated in a vacuum atmosphere at 1,100° C. for 10 minutes, thereby forming a 600-µm-thick Au precoat layer including a layer of a reaction product of the active metal on the base material. For adjustment of the thickness of the precoat layer, the heat treatment was carried out with setting up a simple weir made of carbon around the pure Au solder material. On the precoat layer, an Al foil having a diameter of 5 mm and a thickness of 13 µm (weight: about 0.7 mg) was disposed as an insertion metal layer, and then an Ni or Kovar terminal (diameter: 5 mm) was disposed thereon as a metallic member (terminal). Then, they were heat-pressed in a vacuum atmosphere at 600 to 900° C. for 10 or 60 minutes under a load of 0.15 MPa so as to bond the Ni terminal to the precoat layer. Thereby, bonded members comprising different materials were obtained (Examples 1 to 13). In all cases, no cracks were formed in the base materials at the time of bonding. Further, for the bonded member of Example 1, the hardness of the bonding layer and the concentration of impurities (Ni and Al) in the bonding layer were measured at positions 10, 20, 50, 100, 200, 300, 400 and 500 µm away from the metallic member (Ni). Methods for the measurements will be described later.

Examples 9 to 11

The procedure for the foregoing Examples 1 to 8 was repeated except that in place of the Al foil serving as the insertion metal layer, a crushed Au-5Al alloy or Au-3Al alloy was disposed on the precoat layer in an amount of about 32 mg (corresponds to a diameter of 6.5 mm and a thickness of 50 µm at the time of melting upon preparation of these alloys), that an Ni terminal (diameter: 5 mm) was used as the metallic member (terminal), and that bonding was carried out at 700° C. or 800° C. Thereby, bonded members comprising different materials were obtained (Examples 9 to 11). In all cases, no cracks were formed in the base materials at the time of bonding.

Examples 12 and 13

The procedure for the foregoing Examples 1 to 8 was repeated except that in place of the Al foil serving as the insertion metal layer, an Sn foil having a diameter of 6.5 mm and a thickness of 20 µm (weight: about 4.8 mg) or an In foil having a diameter of 6.5 mm and a thickness of 20 µm (weight: about 4.8 mg) was used, and bonding was carried out at 700° C. Thereby, bonded members comprising different materials were obtained (Examples 12 and 13). In both cases, no cracks were formed in the base materials at the time of bonding.

Comparative Examples 1 to 3

On the surface of a base material made of AlN, a Ti foil having a diameter of 6.5 mm and a thickness of 5 µm (weight: about 0.75 mg) was disposed, and on the Ti foil, a pure Au solder material having a diameter of 6.5 mm and a thickness of 600 µm (weight: about 385 mg) was disposed. Then, they were heated in a vacuum atmosphere at 1,100° C. for 10 minutes so as to form a precoat layer having a thickness of 600 µm on the base material. To adjust the thickness of the precoat layer, the heat treatment was carried out with setting up a simple weir made of carbon around the pure Au solder material. On the precoat layer, an Ni terminal (diameter: 5 mm) was disposed as a metallic member (terminal). Then, they were heat-pressed in a vacuum atmosphere at 800° C. for 10 minutes under loads of 0.15, 0.5 or 10 MPa, respectively so as to solid-phase bond the Ni terminal to the precoat layer (Comparative Examples 1 to 3). Under loads of 0.5 MPa and 10 MPa (Comparative Examples 2 and 3), target bonded members comprising different materials could be obtained, while under a load of 0.15 MPa (Comparative Example 1), bonding was not successful. Further, in Comparative Examples 2 and 3, no cracks were formed in the base materials at the time of bonding.

Examples 14 to 16

Figure 3A:
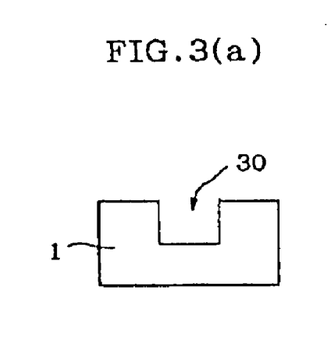
FIGS. 3(a) to (f) are a schematic diagram showing still another embodiment of the production method of a bonded member comprising different materials according to the present invention.
Figure 3B:
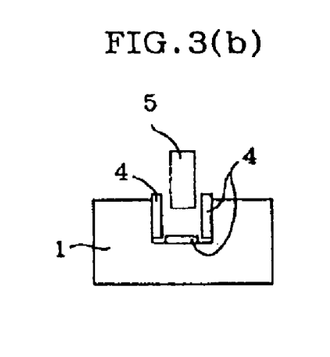
Figure 3C:
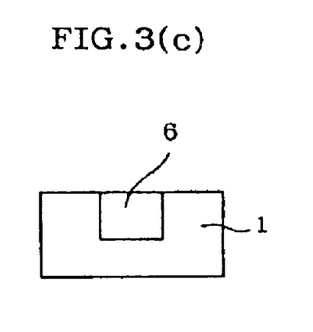
Figure 3D:
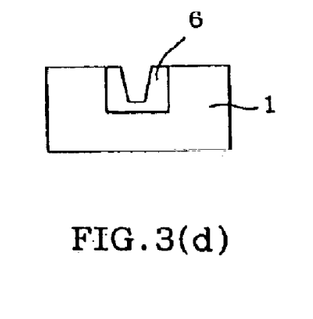
Figure 3E:
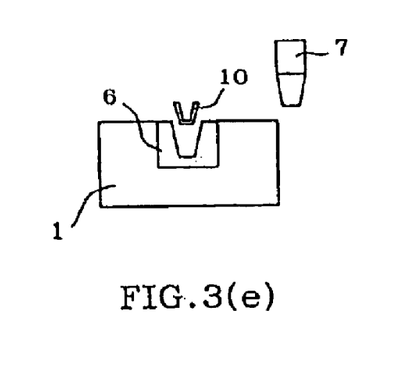
Figure 3F:
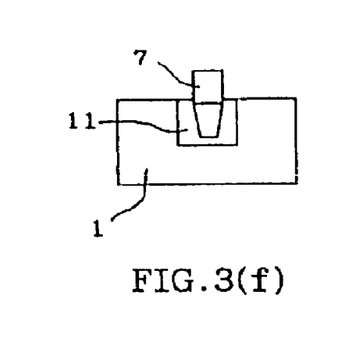

As shown in FIG. 3, in a concave portion 30 (diameter: 7 mm, depth: 12 mm) of an AlN base material 1, a Ti foil (bottom: diameter=6.5 mm, thickness=5 µm (weight: about 0.75 mg), side: 12 mm×22 mm×5 µm in thickness (weight: about 6.0 mg)) as an active metal foil 4 and a pure Au solder material (diameter: 6.5 mm, thickness: 14 mm (weight: about 8.9 g)) as a pure Au solder material 5 were disposed (FIG. 3(b)), and they were then heated in a vacuum atmosphere at 1,100° C. for 10 minutes so as to form a precoat layer 6 inside the concave portion of the base material 1 (FIG. 3(c)). In the precoat layer 6, a tapered truncated-cone shaped hole whose bottom surface had a diameter of 4 mm and side had an inclination of 17° was formed so as to render the shape of the precoat layer concave (FIG. 3(d)). Then, in the concave portion of the precoat layer, a metallic member 7 (Ni terminal) whose foremost portion was covered with an Al foil (thickness: 13 µm) was inserted (FIG. 3(e)). The thickness of the precoat layer from the base material to the bottom (side) of the metallic member was about 1 mm. They were heat-pressed in a vacuum atmosphere at 600 to 800° C. for 60 minutes under a load of 0.15 MPa so as to bond the metallic member 7 to the precoat layer 6. Thereby, bonded members comprising different materials and having the shape shown in FIG. 3(f) were obtained (Examples 14 to 16). In all cases, no cracks were formed in the base materials at the time of bonding.

Comparative Examples 4 and 5

The procedure for the foregoing Examples 14 to 16 was repeated except that the foremost portion of the metallic member (Ni terminal) was not covered with the Al foil and bonding was carried out at 800° C. under a load of 1 or 20 MPa. Thereby, bonded members comprising different materials and having the shape shown in FIG. 3(f) were obtained (Comparative Examples 4 and 5). In both cases, no cracks were formed in the base materials at the time of bonding.

Example 17

The procedure for the foregoing Examples 1 to 8 was repeated except that an Al foil having a thickness of 13 µm was used and bonding was carried out at 600° C. under a load of 0.15 MPa. Thereby, a bonded member comprising different materials was obtained (Example 17). No cracks were formed in the base material at the time of bonding.

Example 18

On an AlN base material having a diameter of 300 mm and a thickness of 15 mm, a Ti foil having an internal diameter of 196 mm, an external diameter of 204 mm and a thickness of 5 µm (weight: about 57 mg) was disposed, and on the Ti foil, a pure Au solder material (solder material cut out of a member having a thickness of 600 µm so as to have the same ring shape as that of the Ti foil, the material provided in such an amount that ensures that it would have an internal diameter of 196 mm, an external diameter of 204 mm and a thickness of 600 μm (weight: about 29.1 g) after molten and bonded). Then, they were heated in a vacuum atmosphere at 1,100° C. for 10 minutes so as to form a precoat layer having an internal diameter of 196 mm, an external diameter of 204 mm and a thickness of 600 μm on the base material. To adjust the width and thickness of the precoat layer, the heat treatment was carried out with setting up a simple weir made of carbon around the pure Au solder material.

On the precoat layer, a pure Al foil having an internal diameter of 197 mm, an external diameter of 203 mm and a thickness of 16 μm (weight: about 81.4 mg) as an insertion metal layer and a Kovar ring having an internal diameter of 198 mm, an external diameter of 202 mm and a length of 60 mm as a metallic member were disposed, and they were then in a vacuum atmosphere at 600° C. for 10 minutes under a load of 0.15 MPa so as to obtain a bonded member comprising different materials (Example 18). No cracks were formed in the base material at the time of bonding.

Comparative Examples 6 to 8

The procedure for the foregoing Example 18 was repeated except that the pure Al foil as the insertion metal layer was not used and bonding was carried out at 800° C. for 10 minutes under loads of 0.15, 1 or 20 MPa, respectively. Thereby, bonded members comprising different materials were obtained (Comparative Examples 6 to 8). In all cases, no cracks were formed in the base materials at the time of bonding.

Measurements of Physical Properties and Tests for Evaluating Physical Properties Measurements of physical properties were made and tests for evaluating the physical properties were conducted on the prepared bonded members comprising different materials. The results are shown in Table 1 (Examples 1 to 13 and Comparative Examples 1 to 3), Table 2 (Examples 14 to 16 and Comparative Examples 4 and 5), Table 3 (Example 17 and Comparative Examples 6 to 8) and Table 4 (Example 1). Methods for making the measurements of the physical properties and Methods for conducting the evaluation tests are as follows.

[Measurement of Bonding Strength Degradation Temperature]

The bonded terminal was heated to 600 to 950° C., and mild shock was given to the terminal in increments of 25° C. A temperature at which the bonded portion was easily broken was taken as a bonding strength degradation temperature (° C.). The results are shown in Table 1.

[Measurement of Impurity Diffusion Distance]

A distance from the surface of the metallic member constituting the bonded member comprising different materials to metal components such as Al, Ni, Fe and Co diffused into the Au precoat layer was measured by performing an EDS analysis on a cross section of the bonded member comprising different materials, and the distance was taken as an impurity diffusion distance (μm). The results are shown in Tables 1 and 2.

[Measurements of Hardness of Bonding Layer and Concentration of Impurities in Bonding Layer]

Vickers hardness ($Hv_{0.1}$) of the bonding layer in the obtained bonded member comprising different materials was measured based on JIS Z2244. The results are shown in Tables 1 and 2. The measurement of the hardness of the bonding layer was made on a portion where no impurities were diffused. Further, for Example 1, a state of impurities (Ni and Al) diffused into the bonding layer and a change in the hardness of the bonding layer were measured meticulously after bonding, after the bonded member of Example 1 was kept at 600° C. for 1,000 hours, and after the bonded member was kept at 700° C. for 1,000 hours. More specifically, the concentrations (wt % (results of EDS analysis)) of Ni and Al in the bonding layer and the hardness ($Hv_{0.1}$) of the bonding layer were measured at positions 10, 20, 50, 100, 200, 300, 400 and 500 μm away from Ni. The results are shown in Table 4.

[Measurement of Bonding Strength (Tensile Strength)]

The obtained bonded member comprising different materials was formed into a bonded member comprising a metallic member (terminal) having a diameter of 5 mm and a thickness of 15 mm, a bonding layer having a diameter of 5 mm and a thickness of 0.5 mm, and a base material having a size of 20 mm×20 mm×5 mm (in thickness). The bonded member was pulled at a pulling rate of 0.5 mm/min, thereby measuring its bonding strength (tensile strength, MPa). The results are shown in Tables 1 and 2.

[Measurement of Bonding Strength (Flexural Strength)]

A horizontal load was imposed on the metallic member at a position 30 mm above the top surface of the base material. A load at which the metallic member was detached was measured and taken as a bonding strength (flexural strength, N·m). The results are shown in Table 2.

[Evaluation of Deterioration of Bonding Strength]

After the bonded terminal was kept in the air at 700° C. for 1,000 hours and after it was subjected to 100 thermal shock cycles each of which was an atmosphere of 700° C. to RT, a tensile test was conducted so as to evaluate deterioration of bonding strength. As for evaluation criteria, a bonded member in which breakages occurred not in the bonded portion but in the base material was evaluated as "Bonding Strength Not Deteriorated", as in the case of the bonded member immediately after bonding. The results are shown in Table 1.

[Examination of Voids at Interface between Bonded Materials]

A cross section was observed by means of an SEM so as to check the presence or absence of voids and cracks at the interface between the bonded materials and identify a state of diffused metal components by means of an EDS. As for evaluation criteria for the voids at the interface, if no voids were found at the interface when the bonded portion was cut and observed, the bonded member was evaluated as "No Voids Found", if the proportion of the voids at the interface was below 5% but some voids were definitely found, the bonded member was evaluated as "Some Voids Found", and if the proportion of the voids at the interface was 5% or higher, the bonded member was evaluated as "Many Voids Found". As for cracks in the AlN base material, the bonded member was evaluated as "No Cracks Found", only when no cracks were found after the solder material was removed by grinding after bonding. The results are shown in Table 2.

[Leak Test]

To examine air tightness of the bonded interfaces of the bonded members of Example 18 and Comparative Examples 6 to 8, a tubular space formed by the ring and the base material which were constituents was measured by means of a helium leak measuring device for a total of two times, i.e., after bonding and after the bonded member was kept in the air at 700° C. for 100 hours. The results are shown in Table 3.

TABLE 1

| | Metallic Member (Terminal) | Precoat Layer | Insertion Metal Layer: Type of Metal | Insertion Metal Layer: Thickness (μm) | Conditions for Bonding: Load (MPa) | Conditions for Bonding: Temperature (°C) | Conditions for Bonding: Time (min) | Bonding Strength Degradation Temperature (°C) | Impurity Diffusion Distance (μm) | Hardness of Bonding Layer (Hv$_{0.1}$) | Cracks in Base Material after Bonding | Bonding Strength (Tensile Strength) (MPa) | Deterioration of Strength 700° C. for 1000 h | Deterioration of Strength 700° C.–RT (100 cycles) |
|---|---|---|---|---|---|---|---|---|---|---|---|---|---|---|
| Example 1 | Ni | Ti Foil + Au | Al | 13 | 0.15 | 600 | 10 | 700 | 50 | 45~55 | No Cracks | ≧120 | No Deterioration | No Deterioration |
| Example 2 | Ni | Ti Foil + Au | Al | 13 | 0.15 | 700 | 60 | 850 | 80 | 45~55 | No Cracks | ≧120 | No Deterioration | No Deterioration |
| Example 3 | Ni | Ti Foil + Au | Al | 13 | 0.15 | 800 | 60 | 925 | 100 | 45~55 | No Cracks | ≧120 | No Deterioration | No Deterioration |
| Example 4 | Ni | Ti Foil + Au | Al | 13 | 0.15 | 900 | 60 | ≧950 | 170 | 45~55 | No Cracks | ≧120 | No Deterioration | No Deterioration |
| Example 5 | Ni | Sputtered Ti + Au | Al | 13 | 0.15 | 800 | 60 | 925 | 50 | 45~55 | No Cracks | ≧120 | No Deterioration | No Deterioration |
| Example 6 | Kovar | Ti Foil + Au | Al | 13 | 0.15 | 600 | 60 | 700 | 40 | 45~55 | No Cracks | ≧120 | No Deterioration | No Deterioration |
| Example 7 | Kovar | Ti Foil + Au | Al | 13 | 0.15 | 700 | 60 | 850 | 50 | 45~55 | No Cracks | ≧120 | No Deterioration | No Deterioration |
| Example 8 | Kovar | Ti Foil + Au | Al | 13 | 0.15 | 800 | 60 | 925 | 50 | 45~55 | No Cracks | ≧120 | No Deterioration | No Deterioration |
| Example 9 | Ni | Ti Foil + Au | Au-5Al | 13 | 0.15 | 700 | 60 | 875 | 40 | 45~55 | No Cracks | ≧120 | No Deterioration | No Deterioration |
| Example 10 | Ni | Ti Foil + Au | Au-5Al | 50 (Crushed Alloy) | 0.15 | 800 | 60 | 925 | 50 | 45~55 | No Cracks | ≧120 | No Deterioration | No Deterioration |
| Example 11 | Ni | Ti Foil + Au | Au-3Al | 50 (Crushed Alloy) | 0.15 | 800 | 60 | 925 | 50 | 45~55 | No Cracks | ≧120 | No Deterioration | No Deterioration |
| Example 12 | Ni | Ti Foil + Au | Sn | 10 | 0.15 | 700 | 60 | 850 | 80 | 45~55 | No Cracks | ≧120 | No Deterioration | No Deterioration |
| Example 13 | Ni | Ti Foil + Au | In | 10 | 0.15 | 700 | 60 | 850 | 70 | 45~55 | No Cracks | ≧120 | No Deterioration | No Deterioration |
| Comparative Example 1 | Ni | Ti Foil + Au | — | — | 0.15 | 800 | 10 | — | — | — | — | — | — | — |
| Comparative Example 2 | Ni | Ti Foil + Au | — | — | 0.5 | 800 | 10 | ≧950 | ≦10 | 45~55 | No Cracks | 35 | No Deterioration | No Deterioration |
| Comparative Example 3 | Ni | Ti Foil + Au | — | — | 10 | 800 | 10 | ≧950 | ≦10 | 45~55 | No Cracks | ≧140 | No Deterioration | — |

TABLE 2

| Metallic Member (Terminal) | Insertion Metal Layer | | | Conditions for Bonding | | | Impurity | Hardness of | Cracks in Base | Bonding Strength | | Voids at Interface |
| | Shape of Precoat Layer | Type of Metal | Thickness ($\mu$m) | Load (MPa) | Temperature (°C.) | Time (min) | Diffusion Distance ($\mu$m) | Bonding Layer ($Hv_{0.1}$) | Material after Bonding | Tensile Strength (MPa) | Flexural Strength (N·m) | between Bonded Materials |
|---|---|---|---|---|---|---|---|---|---|---|---|---|
| Example 14 | Ni | Concave (7 mm$\phi$) | Al | 13 | 0.15 | 600 | 60 | 50 | 45~55 | No Cracks | ≥120 | ≥35 | No Voids |
| Example 15 | Ni | Concave (7 mm$\phi$) | Al | 13 | 0.15 | 700 | 60 | 80 | 45~55 | No Cracks | ≥120 | ≥35 | No Voids |
| Example 16 | Ni | Concave (7 mm$\phi$) | Al | 13 | 0.15 | 800 | 60 | 100 | 45~55 | No Cracks | ≥120 | ≥35 | No Voids |
| Comparative Example 4 | Ni | Concave (7 mm$\phi$) | — | — | 1 | 800 | 60 | No Impurities Diffused | 45~55 | No Cracks | 75 | ≥35 | Some Voids Found |
| Comparative Example 5 | Ni | Concave (7 mm$\phi$) | — | — | 20 | 800 | 60 | No Impurities Diffused | 45~55 | No Cracks | ≥120 | ≥35 | Many Voids Found |
| Example 17 | Ni | Flat | Al | 13 | 0.15 | 600 | 60 | No Impurities Diffused | 45~55 | No Cracks | ≥120 | 7.4 | No Voids |

TABLE 3

| Metallic Member (Ring) | Precoat Layer | Insertion Metal Layer | | Conditions for Bonding | | | Leak Test (for $10^{-10}$ Pa·m³/s) | |
| | | Type of Metal | Thickness ($\mu$m) | Load (MPa) | Temperature (°C.) | Time (min) | After Bonding | 700° C. for 100 h |
|---|---|---|---|---|---|---|---|---|
| Example 18 | Kovar | Ti Foil + Au | Al | 13 | 0.15 | 600 | 10 | 2.4 | 2.6 |
| Comparative Example 6 | Kovar | Ti Foil + Au | — | — | 0.15 | 800 | 10 | Impossible to Measure | — |
| Comparative Example 7 | Kovar | Ti Foil + Au | — | — | 1 | 800 | 10 | Impossible to Measure | — |
| Comparative Example 8 | Kovar | Ti Foil + Au | — | — | 20 | 800 | 10 | 2.7 | 2.5 |

TABLE 4

| | After Bonding | | | After Kept at 600° C. for 240 hours | | | After Kept at 700° C. for 240 hours | | |
| Distance from Ni ($\mu$m) | Concentration of Ni (wt %) | Concentration of Al (wt %) | Hardness ($Hv_{0.1}$) | Concentration of Ni (wt %) | Concentration of Al (wt %) | Hardness ($Hv_{0.1}$) | Concentration of Ni (wt %) | Concentration of Al (wt %) | Hardness ($Hv_{0.1}$) |
|---|---|---|---|---|---|---|---|---|---|
| 10 | 4.82 | 5.54 | 175 | 4.78 | 3.07 | 220 | 14.14 | 1.53 | 250 |
| 20 | 3.24 | 4.72 | 142 | 3.05 | 1.35 | 115 | 13.42 | 1.23 | 228 |
| 50 | 1.24 | 4.22 | 67 | 2.7 | 1.23 | 92 | 6.36 | 0.91 | 134 |
| 100 | 1.1 | 3.3 | 64 | 2.09 | 1.1 | 78 | 4.22 | 0.86 | 112 |
| 200 | 0.72 | 0.26 | 55 | 0.69 | 0.42 | 62 | 1.25 | 0.67 | 72 |
| 300 | 0.59 | 0.07 | 55 | 0.46 | 0.24 | 55 | 1.12 | 0.81 | 66 |
| 400 | 0.2 | 0.05 | 52 | 0.12 | 0.08 | 58 | 0.7 | 0.2 | 62 |
| 500 | 0.03 | 0.07 | 47 | 0.04 | 0.09 | 55 | 0.23 | 0.16 | 58 |

As is clear from the results shown in Table 1, it has been found that when the insertion metal layer comprising Al is disposed on the surface of the precoat layer, the ceramic base material and the metallic member can be bonded together without imposing a special load and that the bonding strength and deterioration in the strength of the obtained bonded member comprising different materials are not inferior to those of the bonded member prepared by solid-phase bonding. Further, it has also been found that metal constituting the insertion metal layer may be Sn or In in addition to Al and bonding can be carried out by disposition of powders such as a crushed material in addition to disposition of a foil of an active metal. Consequently, there has been confirmed an advantage of the present invention that bonding can be accomplished at a low temperature under a small load while a merit of solid-phase bonding that a base material comprising brittle ceramic and a metallic member can be bonded together without imposing a large load on the base material is maintained.

Further, it has also been found from the results shown in Table 2 that when a base material and a metallic member are bonded to each other in the form shown in FIG. 3, the metallic member can be bonded to the base material not only at its bottom (one side face) but also on its side, so that a bonded member comprising different materials with higher bonding strength can be produced easily.

Further, as is clear from the results shown in Table 3, sufficient air tightness was not secured for the bonded members of Comparative Examples 6 and 7 and their air tightness could not be measured in the leak test. In contrast, the bonded members of Example 18 and Comparative 8 had a helium leak amount of 1×10$^{-8}$ Torr or less and showed good sealability upon completion of bonding, and sufficient air tightness was secured. In addition, their air tightness was not lowered even after these bonded members were kept at 700° C. for 100 hours. From these results, it has been found that it is also possible to bond a ring-shaped metallic member to a base material, and since high air tightness which could not be secured by solid-phase bonding unless a high load (Comparative Example 8: 20 MPa) is imposed on the base material can be achieved under a low load (Example 18: 0.15 MPa) in this bonding, a bonded member comprising different materials with excellent air tightness can be produced with ease.

In addition, it has been confirmed from the results shown in Table 4 that after bonding and even after kept at 600° C. for 240 hours and kept at 700° C. for 240 hours, the Au layer whose hardness is high in an area in the vicinity of Ni which is the bonded metallic member (terminal) due to influence of liquid-phase diffusion bonding but kept low in an area apart from Ni, i.e., the Au layer which exhibits a high stress relaxing effect and has low proof stress, is maintained.

As described above, the bonded member comprising different materials according to the present invention is formed by forming a precoat layer from a solder material comprising Au, disposing a metallic member thereon via a given metal foil, and liquid-phase diffusion bonding the metallic member to the precoat layer so as to bond the base material and the metallic member to each other. Consequently, the bonded member of the present invention has air tightness at the interface between the bonded materials and also has excellent thermal cycle properties and thermal shock properties and can be produced by a simple production process. Further, according to the method for producing a bonded member comprising different materials according to the present invention, a precoat layer is formed from a solder material comprising Au, a metallic member is then disposed on the precoat layer via a given metal foil, and the metallic member is then solid-phase diffusion bonded to the precoat layer so as to bond the base material and the metallic member to each other. Consequently, the foregoing bonded member comprising different materials which has air tightness at the interface between the bonded materials and excellent thermal cycle properties and thermal shock properties can be produced easily.

What is claimed is:

1. A method for producing a bonded member by bonding a ceramic base material and a metallic member together, the method comprising the steps of:
   disposing a solder material comprising Au on a surface of the ceramic base material via an active metal layer,
   melting the active metal layer and the solder material by heating so as to form a precoat layer,
   disposing the metallic member on a surface of the precoat layer via an insertion metal layer comprising a pure metal which forms an alloy with the precoat layer and has a lower melting point than Au, or an alloy of the pure metal and Au, and
   melting the insertion metal layer and at least a portion in the vicinity of the interface between the insertion metal layer and the precoat layer by heating so as to bond the metallic member and the precoat layer together, thereby bonding the ceramic base material and the metallic member together with a formation of a bonding layer.

2. The method according to claim 1, wherein the active metal layer is formed by disposing an active metal foil or by sputtering.

3. The method according to claim 1, wherein a paste comprising an active metal and Au is applied and then melted by heating.

4. The method of according to claim 1, wherein the insertion metal layer is formed by disposing a foil or powders of a pure metal or an alloy.

5. The method according to claim 4, wherein the pure metal comprises at least one metal selected from the group consisting of Al, In, Sn, Ge, Tl, Be, Ga, Si, Zn, Sb, Te, Th, Pb, Mg, Ce, Cd, As, and Bi.

6. The method according to claim 5, wherein the pure metal is used in an amount of 0.01 to 10% by mass based on the amount of the solder material.

7. The method according to claim 4, wherein the alloy is used in an amount of 0.01 to 10% by mass based on the amount of the solder material.

8. The method according to claim 1, wherein the ceramic base material comprises aluminium nitride.

9. The method according to claim 1, wherein the metallic member comprises at least one metal selected from the group consisting of Ni, Co, Fe, and Cr.

10. The method according to claim 1, wherein the metallic member comprises an alloy containing as a major component at least one metal selected from the group consisting of Ni, Co, Fe, and Cr.

11. The method according to claim 1, wherein the active metal layer comprises at least one metal selected from the group consisting of Ti, Nb, Hf, and Zr.

12. The method of according to claim 1, wherein in place of the active metal layer, a metallized layer is formed on the surface of the ceramic base material by use of a paste or by a vapor phase process,
   the solder material is then disposed on the metallized layer, and
   the solder material is then melted by heating or solid-phase bonded by pressing so as to form the precoat layer.

13. The method according to claim 1, further comprising an electrical conductor comprising Mo, W or an alloy of Mo and W embedded in the ceramic base material with a portion of the surface of the electrical conductor exposed at the surface of the ceramic base material.

14. The method according to claim 1, wherein the ceramic base material has a concave portion,
   the precoat layer having a shape which fits in the concave portion along the internal surface of the concave portion is formed inside the concave portion, and
   the metallic member having a convex portion which may fit on the precoat layer is also disposed in the concave portion.

15. The method according to claim 14, wherein the concave precoat layer is formed so as to have the shape of a tapered cone or a tapered truncated cone, and
   the metallic member with the convex portion having the shape of a tapered cone or tapered truncated cone which may fit the concave shape is disposed.

16. The method according to claim 14, wherein the concave precoat layer is formed such that its cross section in a vertical direction has the shape of a tapered triangle or a tapered trapezoid, and
   the metallic member having the convex portion whose cross section in a vertical direction has the shape of a tapered triangle or tapered trapezoid which may fit the cross section in the vertical direction of the precoat layer is disposed.

* * * * *